Dec. 24, 1929.  H. THIEL  1,741,082

AUTOMATIC FEED FOR SAWING MACHINES OR THE LIKE

Filed Feb. 16, 1928

Inventor
Heinrich Thiel
By
Attorney.

Patented Dec. 24, 1929

1,741,082

UNITED STATES PATENT OFFICE

HEINRICH THIEL, OF RUHLA, GERMANY

AUTOMATIC FEED FOR SAWING MACHINES OR THE LIKE

Application filed February 16, 1928, Serial No. 254,758, and in Germany January 24, 1928.

In the automatic feed commonly used on shaping and sawing machines the action of the pull element, i. e. of the weight of the automatic feed, is transmitted by means of a band or a strap directly to the work. In order to work with such a directly acting feeding device careful observation is necessary. For example, when curved cutting lines or scrolls are being produced, the work must be permanently turned in the strap which transmits the feeding action, this being very difficult and much time is consumed, especially when working upon a part having sharp edges. By means of an automatic feeding device circular cutting lines can hardly be produced, and then only by very skilled workmen. Also when straight lines are cut and the work is guided on a rule, it is necessary to constantly observe the cutting.

These inconveniences are avoided by the present invention since, for the production of straight, curved and circular cutting lines, a plate, subject to the action of the pull element of the automatic feeding device is mounted on a clamping device which holds the work, so that said plate can freely oscillate and can be adjusted in such a manner that its point of oscillation will be in alignment with an imaginary line passing through the centre of the tool spindle and the center of the active surface of the cutting tool, such as a saw. The clamping device for holding the work consists of a substantially U-shaped bow, composed of two or three parts and provided with clamping screws for holding the work, said bow having a row of vertical holes. One or both of the arms of said bow is shiftably mounted on the transverse bar of the bow and adapted to be secured in such adjusted position.

The plate, which transmits the action of the pull element of the automatic feeding device to the work or to the clamping device, carries a peg for insertion into one of the vertical holes and on which said plate can oscillate.

By these arrangements owing to the equalizing effect of the oscillation of the plate on the peg inserted into the hole situated in a line passing through the center of the saw spindle and the center of the active surface of the cutting tool, such as a saw, during the cutting of straight cutting lines, such straight cutting lines will extend absolutely straight when the work is not being observed by any workman.

During the production of curved or circular cutting lines the peg of the plate is inserted at the right or at the left, according to the line to be cut, into a hole of the row of holes, which hole must always be in alignment with the imaginary line connecting the saw-spindle and the cutting tool.

Inasmuch as the plate is mounted to oscillate, the clamping device or the work can be easily turned while the cutting tool is operating.

The production of straight, curved and circular cutting lines with automatic feed on shaping and sawing machines is greatly facilitated and improved by the invention.

An embodiment of the invention is illustrated, by way of example, in the accompanying drawing, in which:—

Figure 1:
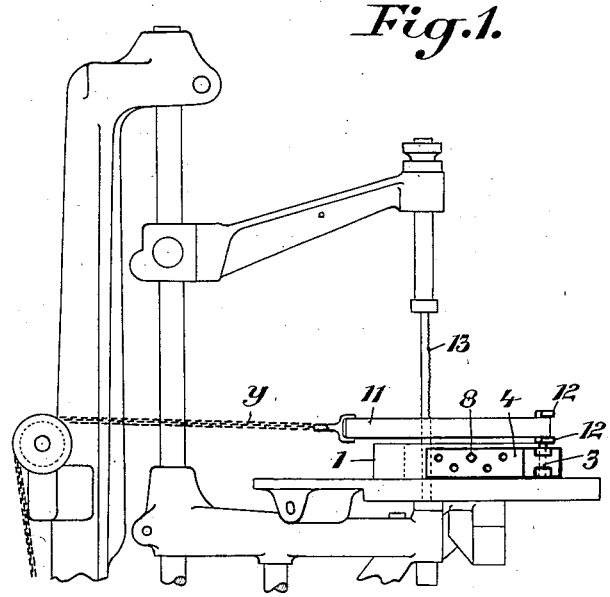
Fig. 1 is a side elevation.
Figure 2:
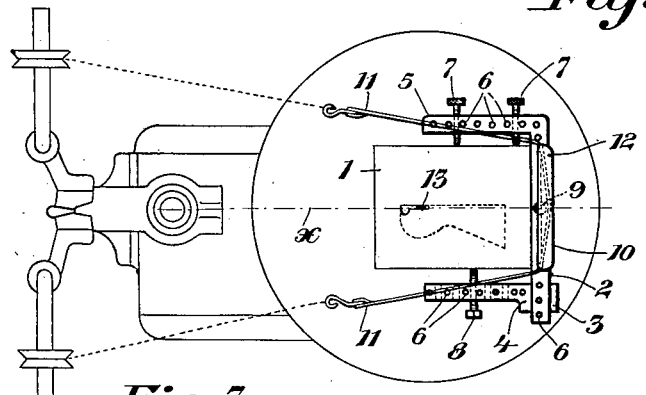
Fig. 2 is a top plan view, the tool-holding arms being omitted.
Figure 3:
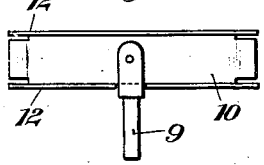
Fig. 3 is a front elevation of the oscillatable plate.
Figure 4:
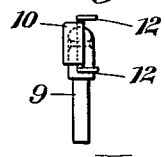
Fig. 4 is an end view of the plate showing one of the curved ends of said plate and the manner in which said plate is secured to its supporting stud.

In the embodiment of the invention shown the substantially U-shaped clamping device for the part 1 to be operated upon consists of a rectangular member having a long arm 2 on which, by means of a suitable guide 3, an arm 4 is mounted so that it can be shifted longitudinally of the arm 2. The two arms 2 and 5 of the angular member each has a row of vertical holes 6 spaced at short intervals. The arm 4 has further, in one of its guides on the arm 2, a bore corresponding to the holes 6, so that it can be secured in its adjusted position by a peg inserted through said bore into one of said holes to form, together with the arms 2 and 5, a substantially U-shaped bow. Clamping screws 7 and 8 for holding the work 1 may be mounted on the arms 4 and 5. Preferably two clamping screws 7 are mounted on one arm and one clamping screw 8 is mounted on the other arm. A stud 9, which may be inserted in any of the vertical holes 6 of the arms 2, 4 or 5, has its upper end of larger diameter than its remaining portion. A vertical plate 10 is secured intermediate its ends in a vertical slot in the enlarged upper end of the stud 9. As shown in Figures 2 and 4, the plate 10 has at each of its upper and lower edges a flange 12 which extends rearwardly therefrom at substantially a right angle thereto and has its opposite ends curved forwardly therefrom. When the stud 9 is mounted in one of the holes of the row of holes of the clamping device it and the center of the plate 10 are always situated on the line $x$ connecting the center of the working surface of the tool and the center of the spindle connecting the arms which support the cutting tool, such as a saw.

The pull element transmitting the action of the automatic feeding device $y$ upon the work 1, for instance a strap 11, is placed over the plate 10 and prevented from slipping off said plate by flanges 12 at the edges of the plate.

Owing to the oscillatability of the plate 10, the feeding device $y$ exerts such an equalizing action upon the feed of the work that, when the parts are arranged as shown in Fig. 2, an absolutely straight cutting line is obtained.

When curved and circular lines are to be cut the clamping device 5, 2, 4 with the clamped work 1 can be easily turned under the plate 10, and the stud 9 can be reinserted, as desired, in any one of the holes 6 of the row of holes so that the pull of the pull-elements $y$ acts permanently perpendicular to the cutting tool 13. During the operating and under permanent action of the pull-element $y$ upon the work 1, this work may also be shifted in the clamping device 5, 2, 4 by loosening the clamping screw 7 and retightening the clamping screw 8 or inversely, whereby a further relieving is ensured for cutting tortuous lines.

The clamping device can, as already stated in the opening paragraph, consist also of two arms 4 and 5 shiftable on the transverse bar 2 and adapted to be secured in the adjusted position. These arms 4 and 5 stand preferably perpendicular to the transverse bar 2 but they might however be arranged at any desired angle to said transverse bar.

I claim:—

1. An automatic feeding device for sawing machines or the like, comprising in combination with a spindle for supporting a cutting tool, a clamping device for holding the work and a cutting tool, a pull element for pulling the work towards said tool, a plate mounted in said clamping device so that it is freely oscillatable and adjustable in such a manner that its point of oscillation may be permanently adjusted in alignment with the imaginary connecting line between the center of said tool supporting spindle and the center of the active edge of said cutting tool.

2. An automatic feeding device as specified in claim 1, in which the clamping device for the work consists of a U-like bow, composed of a plurality of elements each having a row of holes, a guide on the transverse element of said bow and on which one of the other elements is adjustably mounted, means for securing said elements in adjusted positition, and clamping screws for holding the work in the bow.

In testimony whereof I have hereunto set my hand.

HEINRICH THIEL.